United States Patent

Daspit

[11] 4,127,289
[45] Nov. 28, 1978

[54] COUPLING FOR PIPELINES

[76] Inventor: Ronald A. Daspit, 2013 Todd Dr., Poydras, La. 70085

[21] Appl. No.: 802,175

[22] Filed: May 31, 1977

[51] Int. Cl.² .......................................... F16L 21/04
[52] U.S. Cl. .................................... 285/322; 285/348; 285/404
[58] Field of Search ............... 285/323, 322, 421, 404, 285/348, 339, 147, 145

[56] References Cited

U.S. PATENT DOCUMENTS

| | | | |
|---|---|---|---|
| 1,604,580 | 10/1926 | Jaques | 285/147 |
| 1,774,196 | 8/1930 | Davis | 285/147 |
| 2,205,910 | 6/1940 | Raybould | 285/DIG. 11 |
| 2,339,771 | 1/1944 | Davies | 285/348 X |
| 2,937,038 | 5/1960 | Gondek | 285/323 |
| 3,159,414 | 12/1964 | Widman | 285/348 |
| 3,669,475 | 6/1972 | Luckenbill et al. | 285/404 X |
| 3,977,702 | 8/1976 | White, Jr. et al. | 285/145 |
| 3,997,199 | 12/1976 | Arnold | 285/322 |
| 4,000,921 | 1/1977 | Daspit | 285/339 X |

FOREIGN PATENT DOCUMENTS

| | | | |
|---|---|---|---|
| 653,108 | 2/1963 | Italy | 285/323 |

Primary Examiner—Thomas F. Callaghan
Attorney, Agent, or Firm—Charles Richard Werner

[57] ABSTRACT

Coupling for replacement or repairs in pipelines of all categories and of specific utility in vertical submarine pipeline risers so designed for rapidity and simplicity of installation in restricted areas because of its reduced size in addition to its effective sealing characteristics. A coupling that can be readily and simply disconnected and reinstalled without special tools or procedures.

4 Claims, 3 Drawing Figures

COUPLING FOR PIPELINES

BRIEF SUMMARY OF THE INVENTION

Although there are couplings in existence for pipeline repairs and for vertical risers, present day couplings have many drawbacks which my improved type of coupling overcomes. Insofar as I am aware some couplings presently available require epoxy or cement, are large, cumbersome and difficult to handle, require considerable time and effort and special tools and equipment to install, are costly, cannot be used in restricted areas because of their size or manner of installation, and also because of their size when used underwater on vertical risers are subject to wave action which creates considerable undesirable water resistance, are unable to be dismantled and reinstalled or done so with great difficulty and considerable time lapse in the event of leakage or desire for reuse, all of these various undesirable characteristics and detriments making for considerable down time in the operation of the pipe being repaired.

My improved coupling is so designed that it is extremely small in size compared to existing couplings, is simple to install without use of special tools or equipment, and presents much less bulk to be subjected to wave action and consequent water resistance, and further, has a most desirable advantage that the pipe may be placed into service with much less down time than is possible with present day repair couplings.

My coupling is particularly useful in pipeline repairs to be made adjacent to drilling platform legs or within caissons, where a number of pipeline risers are located in restricted areas where it is normally difficult to work, simply because my coupling is of such small size and installation is simple with ordinary available tools. My coupling by its design can be repeatedly disconnected and reconnected, if desired, with simple hand tools.

It is therefore one object of my invention to provide a coupling for pipelines which is simple in construction, considerably less costly in comparison to present day couplings, and sufficiently small in size to allow for easy and rapid installation in restricted areas.

It is a further object of my invention to provide a coupling specifically designed for marine installations with sealing means to eliminate corrosion of the internal components of said coupling and of the bare pipe therewithin.

It is still a further object of my invention to provide a coupling which does not require epoxy or cement or other sealer which would need some drying time prior to use of the pipe.

Another object of my invention is to provide a coupling that can be readily dismantled from the pipe on which it is installed.

One more object of my invention is to provide a coupling which will not interfere with the internal flow through said pipe, or the passage of scratcher or gauging "pigs" for cleaning or gauging purposes.

DETAILED DESCRIPTION OF THE INVENTION

Figure 1:
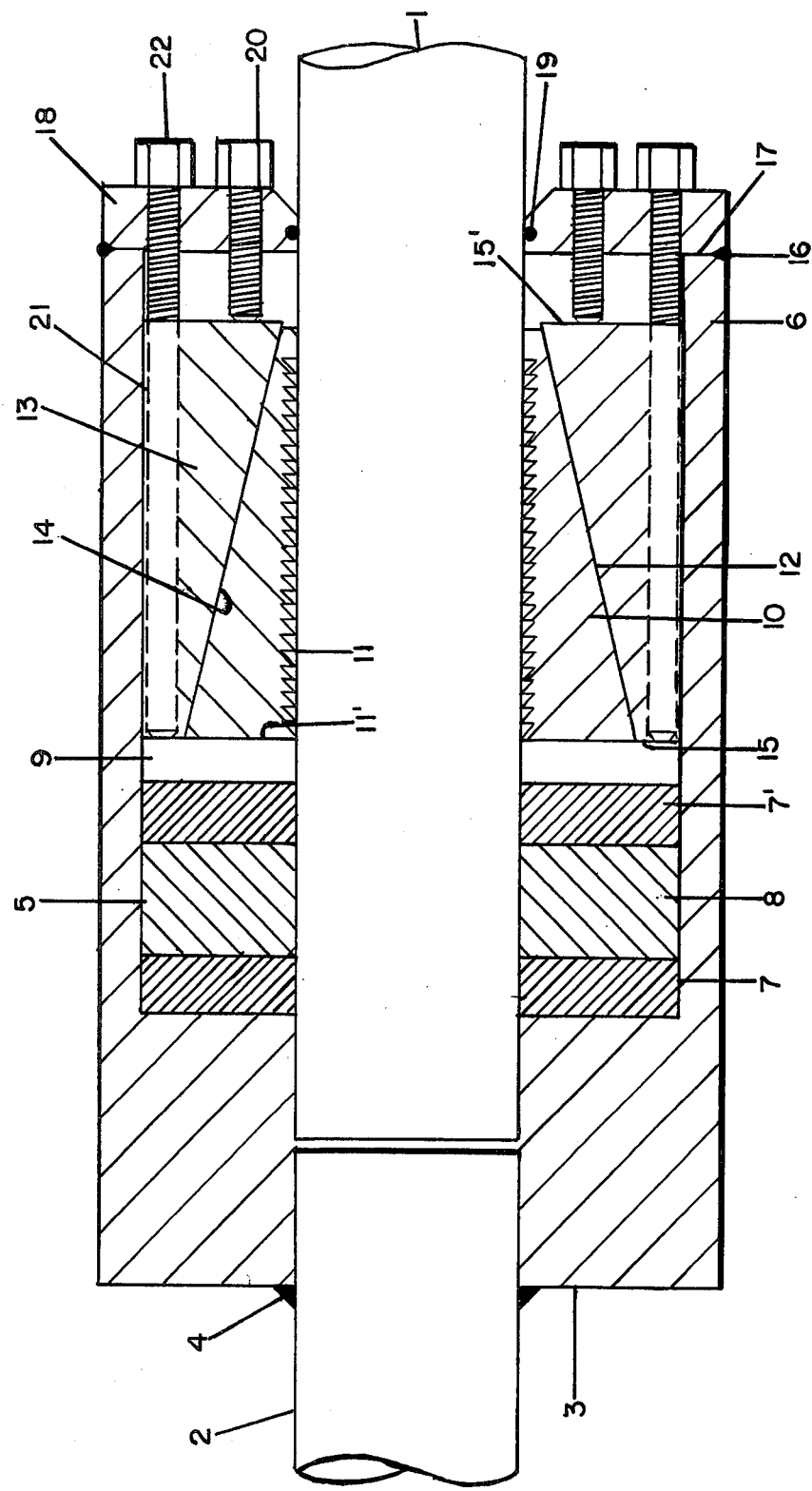
FIG. 1 is cross sectional view through the coupling comprising my invention, shown in position on a portion of a pipe with parts being shown in elevation.
Figure 2:
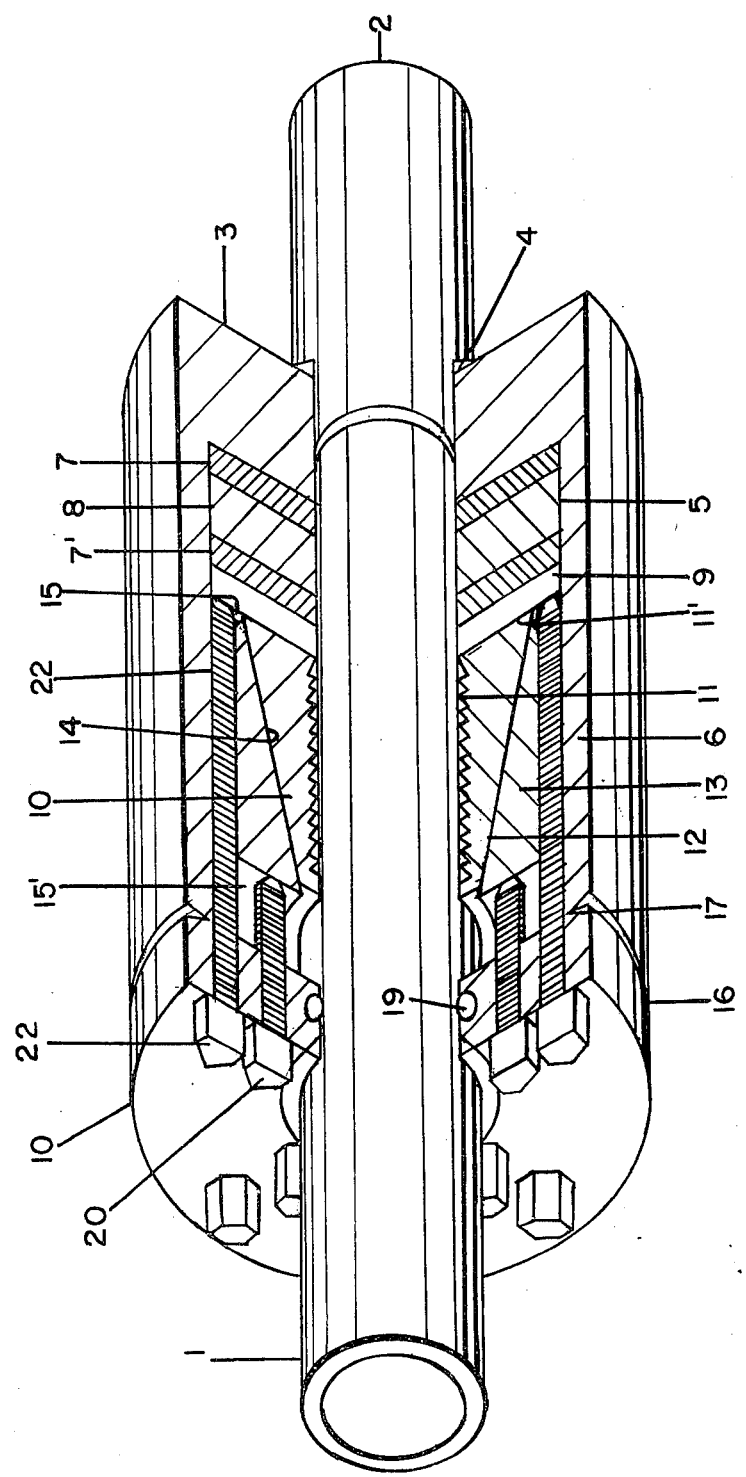
FIG. 2 is an isometric view of the coupling with portion sections to better illustrate the internal construction and assembly of same.

Referring now to the drawings by numerals of reference 1 and 2 depict two ends of pipe forming part of a pipeline, with end of pipe 2 being a new section of the pipeline introduced into and welded at 4 to a coupling body 3. Within the space 5 formed by wall 6 of the coupling body 3 are located spaced sealing rings 7 and 7' preferably formed of an extremely hard rubber and between which is located a wider sealing ring 8 formed of a rubber like material, a metal ring 9 being adapted to bear against the sealing ring 7 for the purpose and in a manner as hereinafter described.

Figure 3:
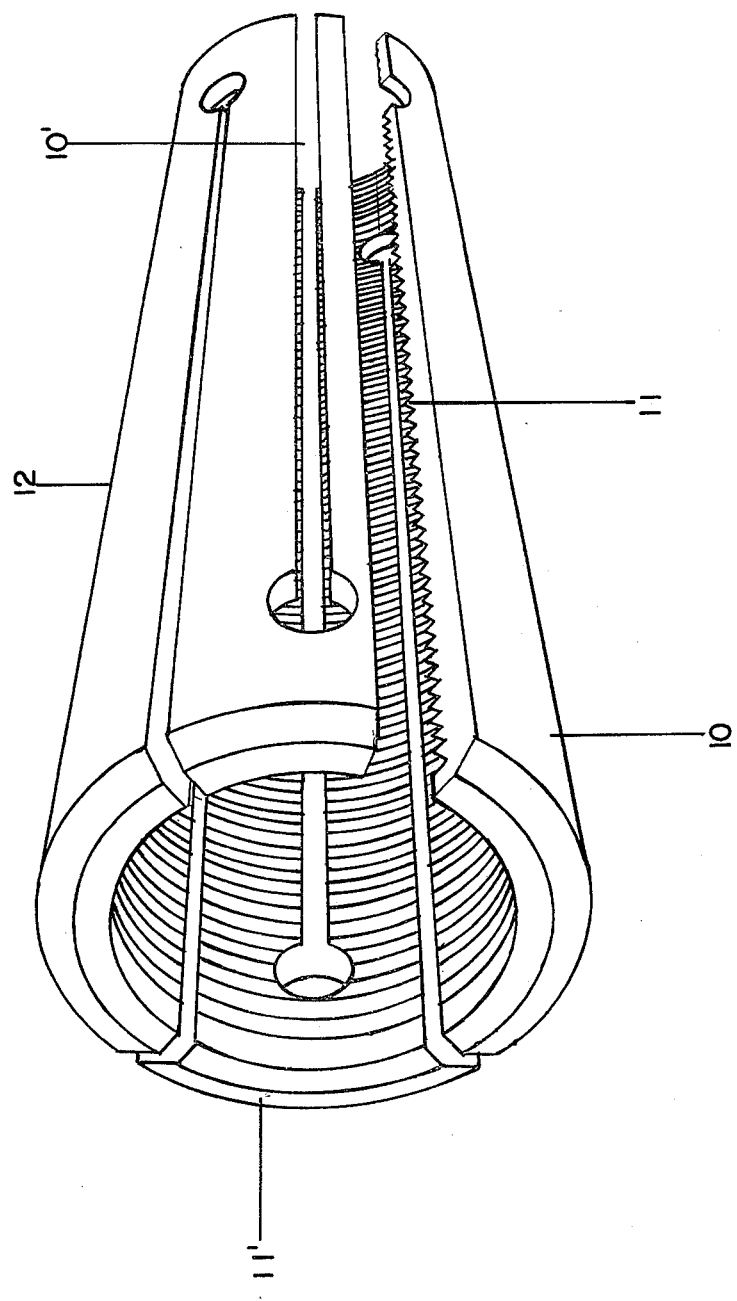
FIG. 3 is an elevational view of the gripping cone with a portion shown in section for clarity of its construction.

A gripping cone 10 with serrated internal surface 11 is adapted to surround the pipe and has one end 11' bearing against the metal ring 9, the external surface 12 of the cone 10 being angular as indicated. Said cone is provided with longitudinal grooves 10' about its periphery, alternating from each end so shown in FIG. 3 allowing contraction and expansion as pressure by compression member 13 is applied or released.

A compression member 13 with internal angular surface 14 resting against angular surface 12 of the cone surrounds said cone and the one end 15 of the compression member rests against the metal ring 9.

Welded at 16 to the end 17 of the wall 6 is the end plate 18 with an O-ring seal 19 between the plate 18 and the pipe 1. A plurality of bolts 20 are threaded through the end plate and contact the end 15' of the compression member 13, rotation of said bolts 20 forcing the compression member 13 against the gripping cone to force said cone and its serrated internal surface 11 against the pipe 2 as well as against the metal ring 9 and sealing rings 7, 7' and 8.

In order to provide additional pressure against the metal ring 9 and the sealing rings, a series of grooves 21 are provided in the compression member 13, through which bolts 22 may freely pass, said bolts being in threaded engagement with end plate 18.

Bolts 20 are rotated to force the ends thereof against the end 15' of the compression member 13 forcing it against the gripping cone for the dual action of gripping the pipeline 1 and forcing the end 11 against the metal ring 9 which in turn will compress the sealing rings 7, 8 and 7'.

Additional compression is achieved by the bolts 22, threadedly carried by the end plate 18 and freely passing through the grooves 21 and bearing against the metal ring 9.

As will be readily seen from the preceding description of the coupling it is simple and inexpensive to manufacture and install, as compared to what is at present available on the market.

It is obvious that changes in form, proportion and details of construction may be resorted to without departing from the spirit of my invention and I reserve all rights to such changes as come within the scope of these specifications and the claims which follow.

What I claim as new and desire to secure by Letters Patent is:

1. A coupling for abutting ends of pipelines of substantially the same diameters, comprising a coupling body welded to one of the pipelines, said coupling body having an end wall at which the one pipeline is welded, an aperture through said end wall, said one pipeline extending partially into said aperture, the end of the other pipeline extending into said aperture, a chamber formed between the wall of said coupling body and the other pipeline, a plurality of abutting sealing members in the chamber between the coupling body and the second mentioned pipeline, said sealing members being adjacent to the end wall of the coupling body, a metal ring bearing against the outermost sealing member, a gripping member having a serrated surface bearing against the second mentioned pipeline, one end of said gripping member bearing against the metal ring, said gripping member having an external angular surface, a compression member having an inner angular surface bearing against the outer angular surface of the gripping member and having one end bearing against the metal ring, a plate welded to the end of the coupling body opposite the end wall and in sealing engagement with the second mentioned pipeline, threaded members in threaded engagement with the plate and adapted to force the compression member against the gripping member and against the metal ring.

2. A coupling for pipelines, as claimed in claim 1, including threaded members in threaded engagement with the plate and freely passing through the compression member and bearing against said metal ring for additional compression against the metal ring and thereby to compress all the sealing members.

3. A coupling for pipelines, as claimed in claim 1, said sealing members comprising a wide sealing member with a pair of narrow sealing members of greater hardness than the wide sealing member, one on each side of the wide sealing member.

4. A coupling for pipelines as claimed in claim 1, said gripping member having circumferentially longitudinal spaced grooves through its perphery providing a degree of elasticity to said gripping member, said grooves alternatingly extending from opposite ends of the gripping member.

* * * * *